United States Patent [19]

Sterner

[11] Patent Number: 4,558,407
[45] Date of Patent: Dec. 10, 1985

[54] ELECTRICAL SAFETY DEVICE CONTROLLED BY MUTUALLY INDEPENDENTLY GENERATED PULSE TRAINS

[75] Inventor: Bengt J. Sterner, Järfälla, Sweden

[73] Assignee: Telefonaktiebolaget LM Ericsson, Stockholm, Sweden

[21] Appl. No.: 446,876

[22] Filed: Dec. 6, 1982

[30] Foreign Application Priority Data

Dec. 17, 1981 [SE] Sweden ............................... 8107568

[51] Int. Cl.⁴ ........................................... H02M 7/537
[52] U.S. Cl. ..................................... 363/132; 363/136
[58] Field of Search .............. 363/132, 136; 246/34 R

[56] References Cited

U.S. PATENT DOCUMENTS

| 3,257,604 | 6/1966 | Colclaser et al. | 363/132 |
| 3,987,989 | 10/1976 | Geiger | 246/34 R |
| 4,201,957 | 5/1980 | Cathell | 363/132 X |
| 4,330,819 | 5/1982 | Foch et al. | 363/132 |
| 4,390,940 | 6/1983 | Corbefin et al. | 363/132 |

FOREIGN PATENT DOCUMENTS 2086672 5/1982 United Kingdom ................ 363/132

*Primary Examiner*—Reinhard J. Eisenzopf
*Attorney, Agent, or Firm*—Roberts, Spiecens & Cohen

[57] ABSTRACT

The invention relates to an electrical safety device controlled by mutually independently generated pulse trains ($i_{a1}$, $i_{b1}$) for providing alternating current ($i_{L1}$) through a winding (L1) only as long as the pulses in the pulse trains occur alternatingly and the components in the safety device are not faulty. The safety device in accordance with the invention includes at least one pair of switching devices (T1, T2) provided with control electrodes (a1, b1) each adapted for receiving a pulse train for alternatingly making the switching devices (T1, T2) conductive and non-conductive. The switching devices (T1, T2) are either connected in series between both poles of a DC voltage source, one end of the windings (L1) being connected to the connection point between said switching devices (T1, T2) while the other end of the winding (L1) is connected either to the center tap of the DC source, or to a potentially stable point via a capacitor (C1) or to the connection point between a further pair of like switching devices provided with control electrodes, each of which is also adapted for receiving a pulse train for making said further pair of switching devices alternatingly conductive and nonconductive, or they are connected with one of their poles to the one pole of the DC voltage source, while the other poles of the switching devices are connected to either end of the winding, which has a center tap connected to the other pole of the DC source.

7 Claims, 20 Drawing Figures

Fig. 4b $i_{ar}$ 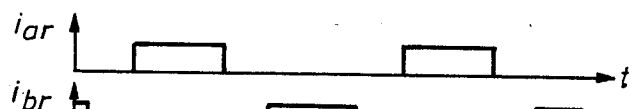
Fig. 4c $i_{br}$ 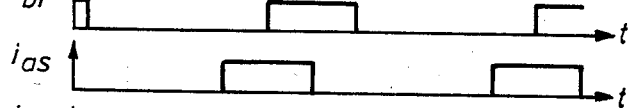
Fig. 4d $i_{as}$ 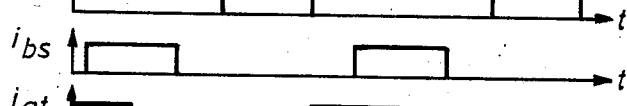
Fig. 4e $i_{bs}$ 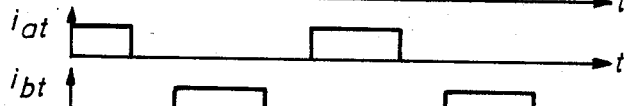
Fig. 4f $i_{at}$ 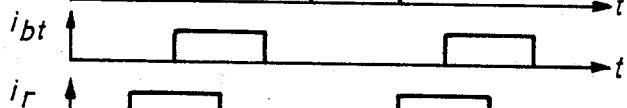
Fig. 4g $i_{bt}$ 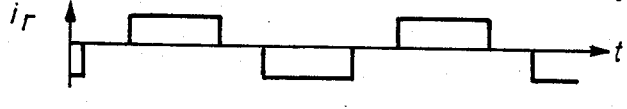
Fig 4h $i_r$ 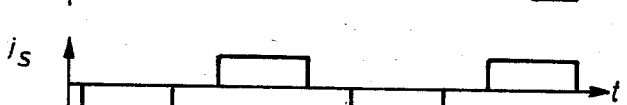
Fig 4i $i_s$ 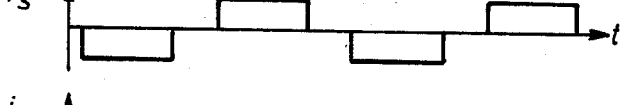
Fig 4j $i_t$ 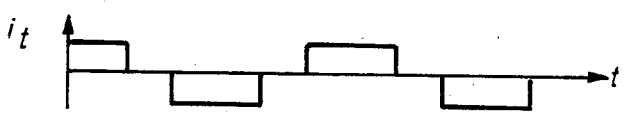
Fig 4k $i_{rs}$ 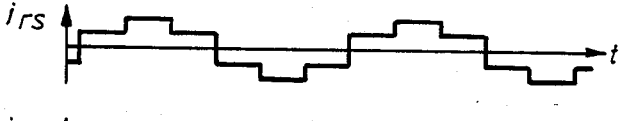
Fig 4l $i_{st}$ 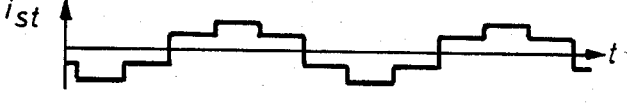
Fig 4m $i_{tr}$ 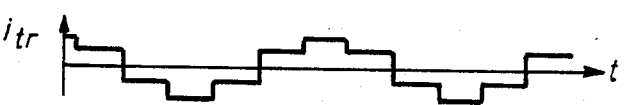

ELECTRICAL SAFETY DEVICE CONTROLLED BY MUTUALLY INDEPENDENTLY GENERATED PULSE TRAINS

FIELD OF THE INVENTION

The present invention relates to a safety device controlled by mutually independently generated pulse trains for providing alternating current through a winding only as long as the pulse trains occur in a predetermined phase position in relation to each other and as long as the components in the safety device are without fault.

BACKGROUND

In railway signalling technology there are special safety requirements for the devices used for controlling, for example, switches and power to lamps in light signals. These devices must be made such that they do not unintentionally feed current to the load when a fault occurs in them. For a long time now these safety devices have been designed to contain and use a special type of relay, a so-called fail-safe signal relay. This also applies to the interlocking logic controlling the safety devices. More lately, the interlocking logic has been implemented with computer control of the fail-safe type. The safety devices themselves have still been made with relays however. From the Swedish Pat. No. 7801810-8, for example, there is known a safety device in which there are two command receivers for receiving a command with the same meaning from a central control apparatus and for combined switching of a device controlling railway traffic and connected to the safety device, these command receivers containing relay means for achieving the switching.

SUMMARY OF THE INVENTION

An object of the present invention is to provide an electronic safety device, i.e., a safety device without electromechanical components.

Briefly, the invention contemplated is an improvement in an electrical safety device controlled by mutually independently generated pulse trains ($i_{a1}$, $i_{b1}$) for providing alternating current ($i_{L1}$) through a winding (L1) only as long as the pulses of said trains occur alternatingly and the components in the safety device are not faulty. The improvement includes incorporating in the safety device a pair of switching devices (T1, T2) provided with control electrodes (a1, b1), each adapted to receive a pulse train ($i_{a1}$, $i_{b1}$) for alternatingly making the switching devices (T1, T2) conductive and non-conductive.

In a first case the switching devices are connected in series between both poles of a DC voltage source, one end of the winding is connected to the connection point between the switching devices, while the other end of the winding is either connected to the center tap of the DC source, or connected to a point of stable potential via a capacitor, or connected to the connection point between a further pair of like switching devices provided with control electrodes, each also arranged for receiving one of said pulse trains or phase-displaced versions of these pulse trains for alternatingly making such further pair of switching devices conductive and non-conductive. In a second case the switching devices are connected by one of their poles to one pole of the DC voltage source, while the other poles of the switching devices are connected to either end of the winding, which has a center tap connected to the other pole of the DC voltage source.

BRIEF DESCRIPTION OF DRAWING

The invention will now be described in detail below with reference to the appended drawing, of which: FIGS. 1b–1d shows the electrical signals at different points of the safety device illustrated in FIG. 1a, FIG. 1e is a modification of the embodiment in FIG. 1a; FIGS. 4b–4m illustrate the currents at different points in the safety device illustrated in FIG. 4a.

DETAILED DESCRIPTION OF THE INVENTION

Figure 1A:
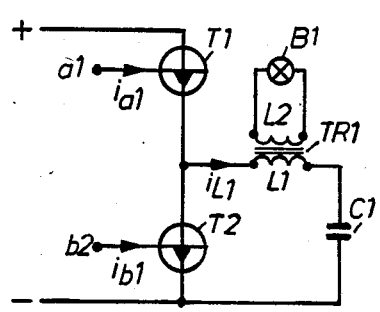
FIG. 1a illustrates a first embodiment of the inventive safety device.

FIG. 1a illustrates an embodiment of the safety device in accordance with the invention in the form of a single-phase transistor bridge with one branch and an artificial neutral point with a stable potential. In the single branch of the bridge there are two transistors T1 and T2 connected in series with each other between both poles of a DC voltage source, shown schematically by polarity characters. The connection point between the transistors T1 and T2 is connected to one end of a winding L1 constituting the primary winding in a transformer TR1, a load B1 being connected across the secondary winding L2 of the transformer. In the embodiment illustrated, the load B1 is a signal lamp for controlling railway traffic. A capacitor C1 is connected between the other end of the primary winding L1 and the negative pole of the DC source.

The safety device illustrated in FIG. 1a is intended to drive the signal lamp B1 with alternating current in response to two mutually independently generated pulse trains with alternatingly occurring pulses, and which are each supplied to one of the bases a1 and b1 of the transistors T1 and T2, respectively. Both pulse trains $i_{a1}$ and $i_{b1}$, illustrated in FIGS. 1b and 1c, respectively, can be generated, e.g., with the aid of a computer, on the basis of two mutually independent programs.

Figure 1B:
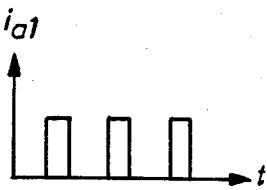
Figure 1C:
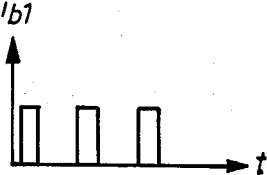
Figure 1D:
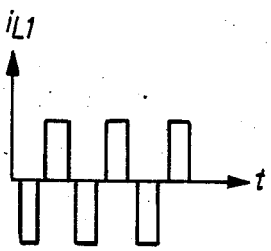
Figure 1E:
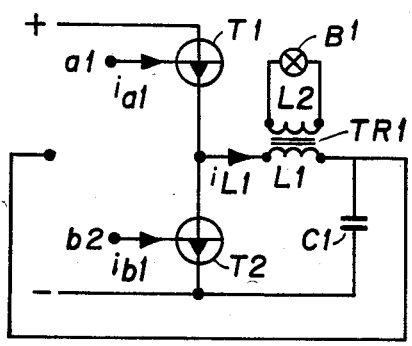

If the pulses of both pulse trains occur alternatingly in the manner illustrated in FIGS. 1b and 1c, there is obtained in the primary winding L1 of the transformer TR1 an alternating current $i_{L1}$ with the appearance illustrated in FIG. 1d, where the connection point between the primary winding L1 and the capacitor C1 constitutes the above-mentioned artificial neutral point, which can also be a center tap of the DC voltage source as shown in FIG. 1e. The current illustrated in FIG. 1d will hereby induce a like but counter-directed current in the secondary winding L2 of the transformer TR1, this latter current driving the signal lamp B1 so that it is illuminated as long as the pulses of the pulse trains occur alternatingly and the components in the safety device are faultfree.

On the other hand, if the pulse trains occur in phase positions such that the transistors will be conductive simultaneously, or either of the pulse trains is absent, or some component becomes faulty, no alternating current will flow through the primary winding, and consequently no current will be induced in the secondary winding whereby the signal lamp B1 thus will not become illuminated.

Both pulse trains naturally do not need to occur exactly in the phase positions shown in FIGS. 1b and 1c. The main object is that the pulse sequence is such that the transistors become alternatingly conductive. This alternating conduction can be accomplished by pulse trains that are complementary.

Figure 2:
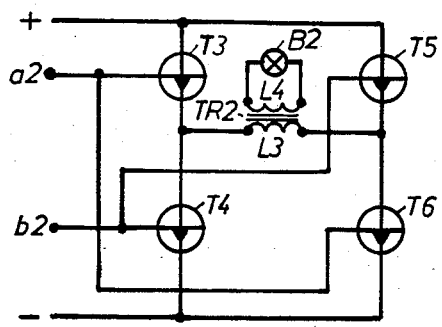
FIG. 2 illustrates a second embodiment of the inventive safety device.

Another embodiment of the safety device in accordance with the invention is illustrated in FIG. 2 in the form of a single-phase transistor bridge with two branches. Two series circuits are connected in parallel between both poles of a DC source, not more closely illustrated. A transistor T3 is connected in series with a transistor T4 in one series circuit, while in the other series circuit a transistor T5 is connected in series with a transistor T6. The primary winding L3 of a transformer TR2 is connected between the connection points between each pair of transistors. As in the embodiment according to FIG. 1, a load B2 in the form of a railway signalling lamp is connected across the secondary winding L4 of the transformer TR2. The base of the transistor T6 is connected to the base of the transistor T3 to form a common input a2. In a corresponding manner, the bases of transistors T5 and T4 are connected to form a second common input b2. The input a2 is intended to receive a pulse train of the type illustrated in FIG. 1b, while the input b2 is intended to receive a pulse train of the type illustrated in FIG. 1c. An alternating current of the type illustrated in FIG. 1d will be generated in the primary winding L3 of the transformer TR2, this alternating current inducing a current in the secondary winding L4 and this latter induced current causes the signal lamp B2 to illuminate. As with the embodiment according to FIG. 1, the signal lamp B2 will not light up if, for example, the transistors T3 and T4 become conductive simultaneously, or either of the pulse trains is lacking or some component becomes faulty.

Figure 3:
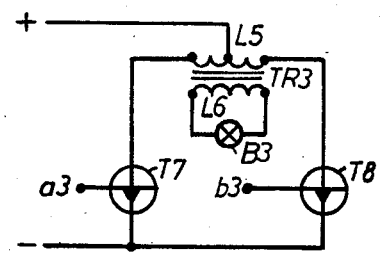
FIG. 3 illustrates a third embodiment of the inventive safety device.

A third embodiment of the inventive safety is illustrated in FIG. 3 in the form of a single phase bridge with two half branches and a transformer with a central terminal. The collectors of two transistors T7 and T8 are connected to either end of the primary winding L5 of a transformer TR3, while the emitters of the transistors are connected to the negative pole of a not more closely illustrated DC voltage source, the positive pole of which is connected to the central terminal of the primary winding L5. A load B3 in the form of a railway signal lamp is connected over the secondary winding L6 of the transformer TR3 in the same way as in FIGS. 1a and 2. The bases a3 and b3 of the transistors T7 and T8, respectively, are each intended for receiving a pulse train of the types shown in FIGS. 1b and 1c. An alternating current of the appearance illustrated in FIG. 1d will hereby be induced in the secondary winding L6 for causing the signal lamp b3 to illuminate. The latter will naturally not be illuminated if the transistors T7 and T8 become conductive simultaneously or either of the pulse trains is lacking or some component becomes faulty.

In all the embodiments described so far, the loads B1, B2 and B3 may also constitute a rectifier bridge, for example, for supplying optional apparatuses with DC current, which can be caused to stop in a safe way with the aid of a safety device in accordance with the invention.

Figure 4A:
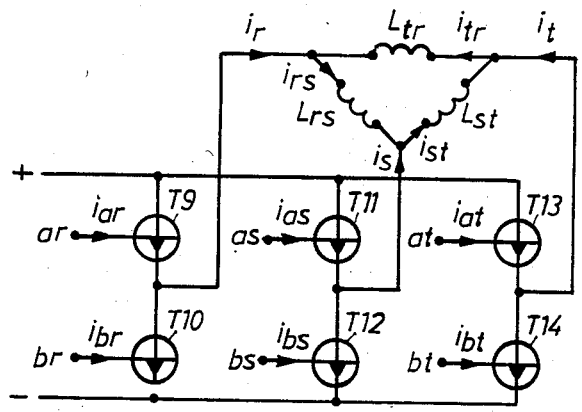
FIG. 4a illustrates a fourth embodiment of the inventive safety device.

A fourth embodiment of the safety device in accordance with the invention is illustrated in FIG. 4a, in the form of a three-phase transistor bridge with one branch per phase. Three series circuits are connected in parallel between the positive and negative poles of a DC source. The first series circuit comprises a transistor T9 in series with a transistor T10, while the second series circuit comprises a transistor T11 in series with a transistor T12, and the third series circuit comprises a transistor T13 in series with a transistor T14. The connection point between the transistors T9 and T10 is connected (a) to one end of a phase winding $L_{rs}$, the other end of which is connected to the connection point between the transistors T11 and T12 and (b) to one end of a phase winding $L_{tr}$, the other end of which is connected to the connection point between the transistors T13 and T14. The latter connection point is also connected to one end of a phase winding $L_{st}$, the other end of which is connected to the connection point between the transistors T11 and T12.

In the embodiment illustrated in FIG. 4a the phase windings $L_{rs}$, $L_{tr}$ and $L_{st}$ are Delta-connected. These phase windings, which may constitute phase windings in a three-phase transformer with optional load or a three phase motor, may also be star-connected.

To provide alternating current through the respective phase winding the bases of the transistors T9–T14 are intended to be supplied with pulse trains of the type illustrated in FIGS. 4b–4g. Alternating current will hereby be generated in the phase windings $L_{rs}$, $L_{st}$ and $L_{tr}$ in accordance with what is apparent from FIGS. 4k, 4l and 4m, respectively. The currents $i_r$, $i_s$ and $i_t$ are shown in the respective FIGS. 4h, 4i and 4j.

The embodiment illustrated in FIG. 4a can be used for operation, e.g., of a railroad switch.

In the embodiments illustrated in FIGS. 1a, 2, 3 and 4a the intended alternating current is generated only as long as the control pulse trains occur alternatingly and the components in the safety device are faultfree.

In FIGS. 1a, 2, 3 and 4a the safety device in accordance with the invention has been shown as being built up from transistors. It should be emphasized that thyristors are just as utilizable in the illustrated embodiments.

What is claimed is:

1. In a railway system having an alternating current utilization device with a winding means, the method of fail-safe energizing the utilization device comprising the steps of connecting a pair of switching means in series across a DC voltage source, connecting one end of said winding means to the junction of the switching means, and connecting the other end of the winding means to a center tap of the DC voltage source, each of said switching means being conductive when receiving a pulse signal, said switching means being arranged such that when one of the switching means is energized current flows through the winding means in one direction and when the other switching means is energized current flows through the winding means in the opposite direction, feeding a first pulse train to one of the switching means and a second pulse train to the other of the switching means, said first and second pulse trains being complementary.

2. The method of claim 1 wherein the utilization device is a transformer having a primary winding and a secondary winding with a load connected across the secondary winding.

3. The method of claim 2 wherein said load is a railway signal lamp.

4. The method of claim 2 wherein said load is a rectifier bridge.

5. In a railway system having an alternating current utilization device connected across the secondary winding of a transformer having a center tapped primary winding, the method of fail-safe energizing the utilization device comprising the steps of providing a two-terminal DC voltage source, connecting the center tap of the primary winding to one terminal of the DC voltage source, connecting one of the switching means between one end of the primary winding and the other terminal of the DC voltage source, and connecting the other end of the switching means between the other end of the primary winding and the other terminal of the DC voltage source, each of said switching means being conductive when receiving a pulse signal, said switching means being arranged such that when one of the switching means is energized current flows through the secondary winding in one direction and when the other switching means is energized current flows through secondary winding in the opposite direction, feeding a first pulse train to one of the switching means and a second pulse train to the other of the switching means, said first and second pulse trains being complementary.

6. The method of claim 5 wherein said utilization device is a railway signal lamp.

7. The method of claim 5 wherein said utilization device is a rectifier bridge.

* * * * *